United States Patent
Mathews et al.

(10) Patent No.: US 7,036,484 B2
(45) Date of Patent: May 2, 2006

(54) IDLE SPEED CONTROL USING ALTERNATOR

(75) Inventors: David S. Mathews, Howell, MI (US); Nick S. Kapsokavathis, Shelby Township, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/414,702

(22) Filed: Apr. 16, 2003

(65) Prior Publication Data

US 2004/0206332 A1  Oct. 21, 2004

(51) Int. Cl.
F02D 41/16 (2006.01)

(52) U.S. Cl. ............... 123/339.11; 123/339.16; 123/339.23; 290/40 A

(58) Field of Classification Search ........... 123/339.11, 123/339.16–339.19, 339.23; 290/40 A, 41
See application file for complete search history.

(56) References Cited

U.S. PATENT DOCUMENTS

| | | | | |
|---|---|---|---|---|
| 4,520,272 A | * | 5/1985 | Danno et al. | 290/40 A |
| 5,111,788 A | * | 5/1992 | Washino | 123/339.11 |
| 5,712,786 A | * | 1/1998 | Ueda | 123/339.18 |
| 6,109,237 A | * | 8/2000 | Pels et al. | 123/339.19 |
| 6,378,492 B1 | * | 4/2002 | Liu | 123/339.18 |

FOREIGN PATENT DOCUMENTS

JP 3222825 A1 * 10/1991

* cited by examiner

*Primary Examiner*—Tony M. Argenbright
(74) *Attorney, Agent, or Firm*—Christopher DeVries

(57) ABSTRACT

An engine system includes an engine, an alternator, a load, and a controller that communicates with the engine, the alternator, and the load. The controller signals the engine to drive the alternator when the engine idles. When a load increase on the engine is detected, the controller reduces an alternator load on the engine in response to the load increase. Air flow into the engine is adjusted to compensate for the load increase, and concurrently the alternator load is increased. When a load decrease is detected, the alternator load is increased, and the air flow is subsequently adjusted while decreasing the alternator load. In another embodiment, spark timing of the engine is adjusted to compensate for the load decrease.

15 Claims, 3 Drawing Sheets

IDLE SPEED CONTROL USING ALTERNATOR

FIELD OF THE INVENTION

The present invention relates to engine idle speed control, and more particularly to using an alternator to achieve engine idle speed control.

BACKGROUND OF THE INVENTION

Vehicle engines provide power for a plurality of external loads such as an alternator, an A/C compressor, a power steering pump, a hydraulic pump, etc. When these loads require power, the engine, increases power output to maintain driving power, which is noticeable when the engine is idling. A noticeable dip in engine idle speed occurs when engine power is used to drive the load, which is undesirable.

Conventional engine controllers advance the spark timing of the engine to compensate for the loss in engine power and the resulting dip in idle speed. Spark advance provides a fast acting engine torque actuator that compensates for the reduced engine power and maintains constant speed. During idle, spark advance causes the engine to be less efficient. Additionally, combustion instabilities occur and difficulties are presented in misfire calibration.

SUMMARY OF THE INVENTION

The present invention provides an engine system having an engine, an alternator, a load, and a controller. The controller communicates with the engine, the alternator, and the load. The controller signals the engine to drive the alternator when the engine idles. When the controller detects a load increase on the engine, the controller reduces a load of the alternator on the engine to maintain an idle speed of the engine.

In one aspect, the controller adjusts air flow into the engine to compensate for the load increase and concurrently increases the alternator load.

In another aspect when the controller detects a load decrease on the engine, the controller increases the alternator load to compensate for the load decrease. Further, the controller adjusts the air flow into the engine while decreasing the alternator load to maintain the idle speed of the engine.

In an alternative aspect, when the controller detects a load decrease on the engine, the controller adjusts spark timing of the engine to compensate for the load decrease to maintain the idle speed of the engine.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
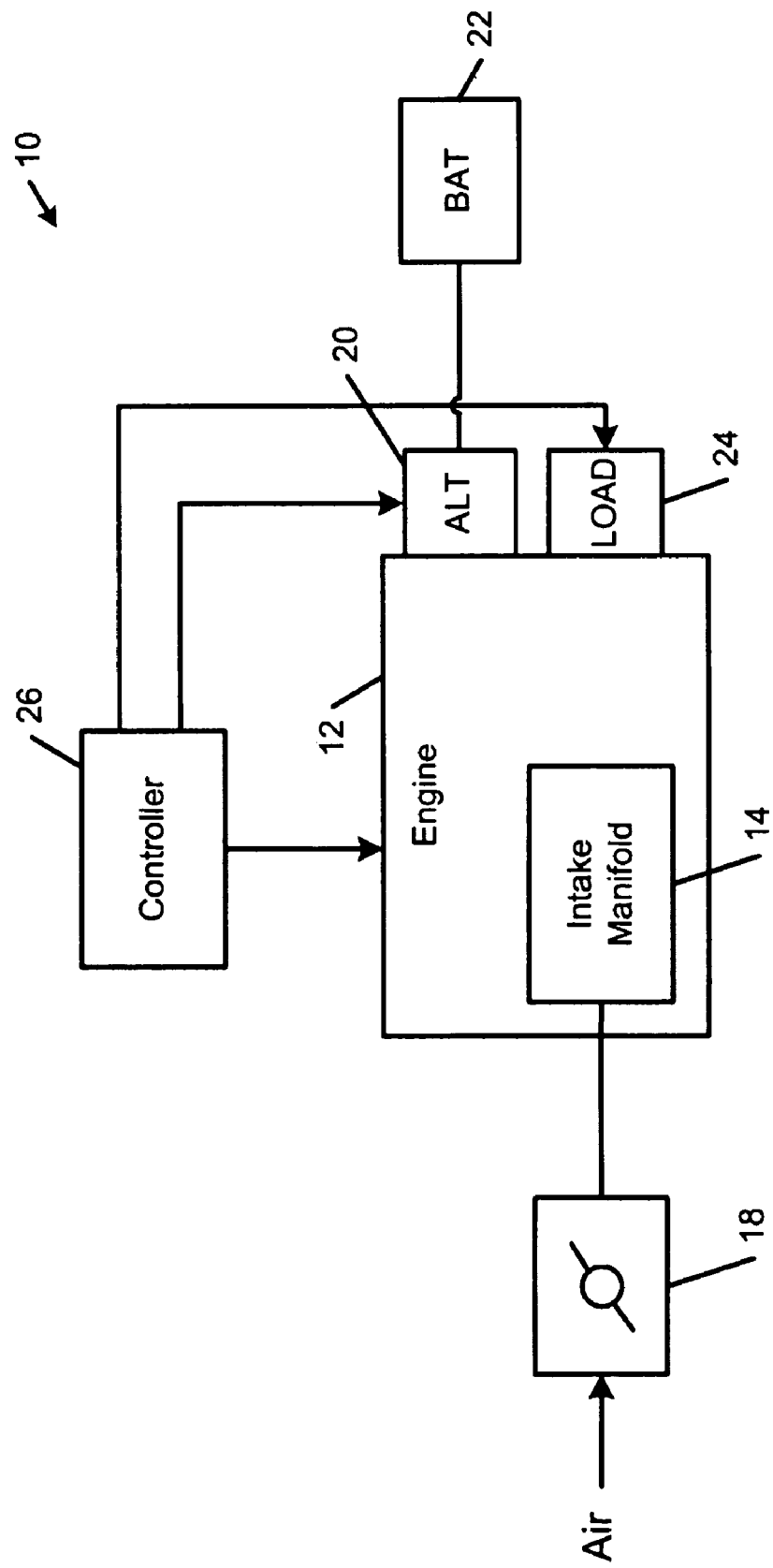
FIG. 1 is a functional block diagram of an engine system.

The following description of the preferred embodiment is merely exemplary in nature and is in no way intended to limit the invention, its application, or uses. For purposes of clarity, the same reference numbers will be used in the drawings to identify similar elements.

With reference to FIG. 1, a block diagram of an engine system 10 according to the present invention is shown. The engine system 10 includes an engine 12 and an intake manifold 14. Air is directed into the cylinders (not shown) of the engine 12 through the intake manifold 14. A throttle 18 controls the mass of air flowing to the intake manifold 14. The throttle 18 can be adjusted directly by an accelerator pedal or by an electronic throttle controller and the accelerator pedal.

An alternator 20 is selectively driven by the engine 12 to charge a battery 22. The engine 12 provides power to one or more loads 24. The load 24 represents one or more engine-driven loads including, but not limited to, an air conditioning compressor, a power steering pump, transmission pump, and the like. A controller 26 communicates with the throttle 18, the engine 12, the alternator 20, and the load 24. The controller 26 executes an engine idle speed control algorithm, as will be discussed in further detail below.

Figure 2:
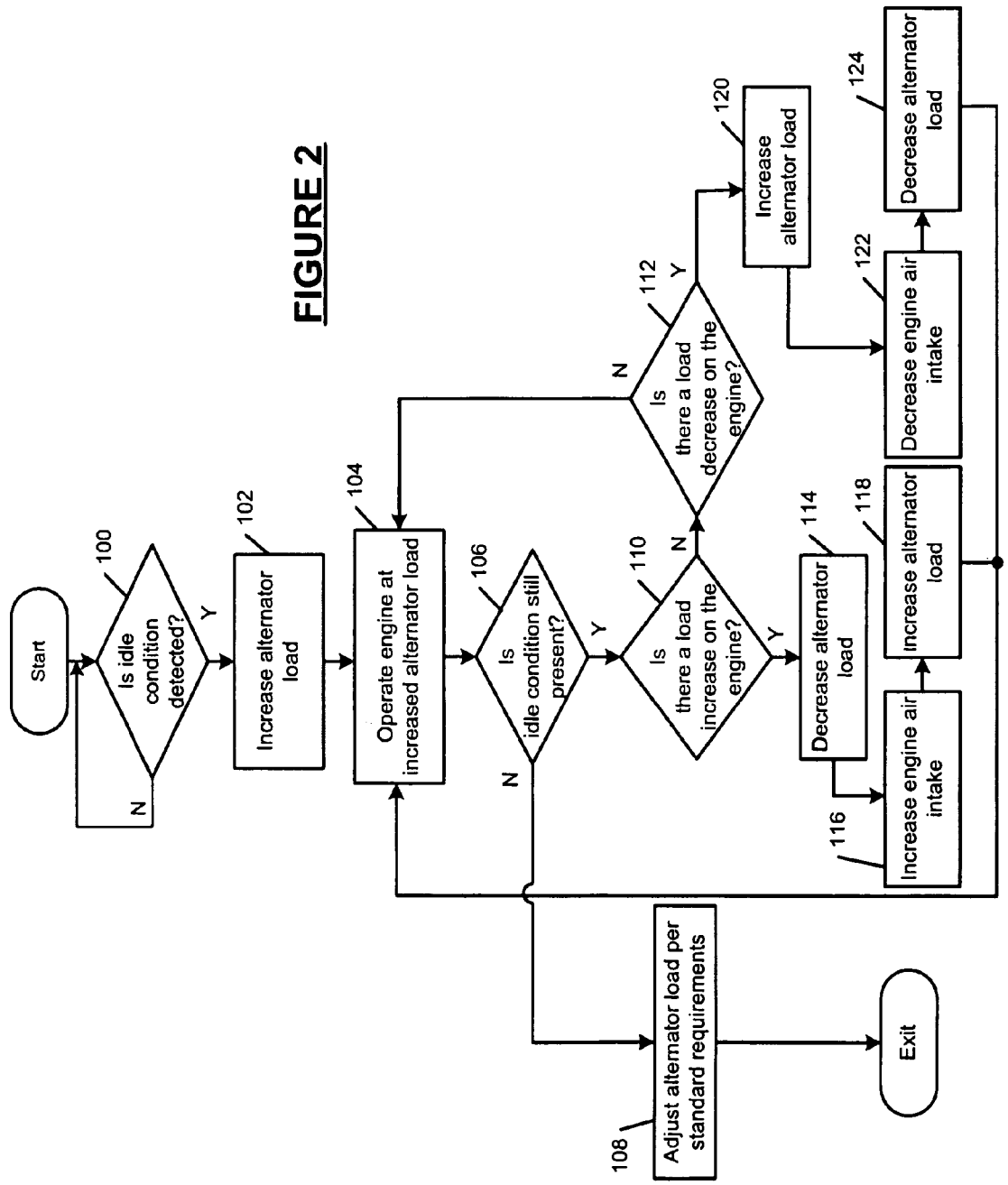
FIG. 2 is a flowchart detailing an engine idle speed control method according to the present invention.

Referring now to FIG. 2, the idle speed control algorithm will be discussed in detail. After a start step, control determines whether an idle condition of the engine 12 is detected in step 100. If an idle condition is not detected, control loops back to step 100. If an idle condition is detected, control signals an increase in the alternator load on the engine 12 in step 102. In step 104, the engine 12 operates at the increased alternator load.

In step 106, control checks whether the idle condition is still present. If not, control operates the alternator 20 at a standard load in step 108 and controls ends. The standard load reflects the load required to maintain a charge level of the battery 22. The standard load is determined by a conventional battery charge algorithm. If the idle condition is still present, control determines whether there is an increased load on the engine 12 in step 110. An increased load on the engine 12 occurs when the load 24 is driven by the engine 12. If there is no load increase on the engine 12, control continues with step 112. If there is an increased load on the engine 12, control continues with step 114 where the alternator load is decreased to compensate for the load increase.

After decreasing the alternator load, the air intake into the engine 12, and the alternator load are increased in steps 116 and 118, respectively. The increased air intake increases the engine idle speed. The concurrent increase in alternator load, which would otherwise decrease the engine idle speed, maintains the engine idle speed at a substantially constant value. Gradually, the alternator load is increased to the level prior to the decrease in step 114. After steps 116 and 118 have been executed, control loops back to step 104.

In step 112, the algorithm determines whether there is a load decrease on the engine 12. If there is no load decrease, control loops back to step 104. If a load decrease is detected, control continues with step 120, where, in accordance with one embodiment of the present invention, the alternator load is increased. In this manner, the alternator load compensates for the decreased load, and maintains engine idle speed. Once the alternator load has been increased, the air intake into the engine is decreased, and the alternator load is decreased in steps 122 and 124, respectively. The decreased air intake decreases the engine idle speed. The concurrent decrease in alternator load, which would otherwise increase the engine idle speed, enables the engine idle speed to remain constant.

With reference to step 120, and in accordance with an alternative embodiment, if a load decrease is detected, spark timing of the engine 12 is adjusted to compensate for the decreased load to maintain the engine idle speed.

Figure 3:
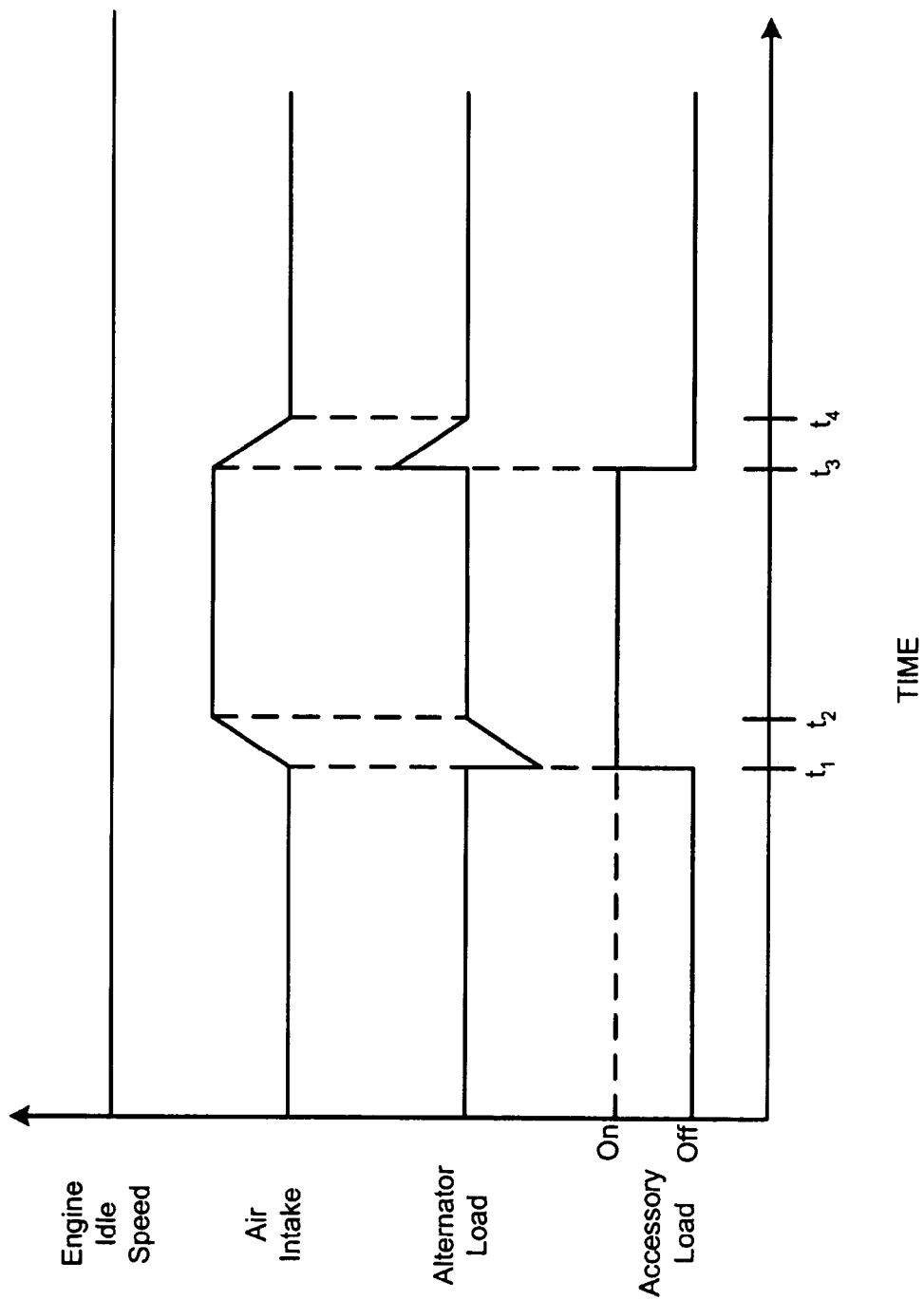
FIG. 3 is a graph detailing the engine idle speed control method.

FIG. 3 depicts the engine idle speed, air intake, alternator load, and accessory load as a function of time. As shown, the engine idle speed remains static until time $t_1$, when the load 24 is switched on. In response to activation of the load 24, the alternator load immediately decreases, and compensates for the load 24. Between times $t_1$ and $t_2$, the air intake and alternator load are increased until the alternator load achieves the prior (pre-$t_1$) level. The engine idle speed remains static. At time $t_3$, the load 24 is turned off and the alternator load immediately increases to compensate for the decreased load. Between times $t_3$ and $t_4$, the air intake is decreased and the alternator load decreases, until the alternator load achieves its pre-$t_3$ level. As a result, the engine idle speed remains constant.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

The invention claimed is:

1. An engine system comprising:
   an engine;
   an alternator having an adjustable load driven by said engine;
   a second load that is selectively driven by said engine; and
   a controller that communicates with said engine, said alternator, and said second load, wherein said controller signals said engine to drive said alternator when an idle condition is detected, and wherein when said controller detects an increase in said second load on said engine, said controller reduces said adjustable load of said alternator on said engine in response to said increase in said second load while adjusting spark timing to maintain an idle speed of said engine.

2. The engine system of claim 1 wherein said controller adjusts air flow into said engine to compensate for said second load increase and concurrently increases said adjustable load.

3. The engine system of claim 2 wherein said controller detects a decrease in said second load, increases said adjustable load to compensate for said second load decrease, and adjusts said air flow into said engine while decreasing said adjustable load to maintain said idle speed of said engine.

4. A method of controlling idle speed of an engine comprising:
   operating an alternator to provide an alternator load when an idle condition is detected;
   detecting a load increase on said engine; and
   reducing said alternator load on said engine in response to said load increase to maintain said idle speed of said engine.

5. The method of claim 4 further comprising:
   adjusting air flow into said engine to compensate for said load increase; and
   increasing said alternator load concurrently with said adjusting.

6. The method of claim 4 further comprising:
   detecting a load decrease on said engine; and
   adjusting spark timing to compensate for said load decrease, to maintain said idle speed of said engine.

7. The method of claim 5 further comprising:
   detecting a load decrease on said engine;
   increasing said alternator load to compensate for said load decrease; and
   adjusting said air flow into said engine while decreasing said alternator load to maintain said idle speed of said engine.

8. A method of controlling idle speed of an engine comprising:
   detecting an idle condition of said engine;
   increasing an alternator load in response to said idle condition;
   detecting a load increase on said engine; and
   reducing said alternator load on said engine in response to said load increase to maintain said idle speed of said engine.

9. The method of claim 8 further comprising:
   adjusting air flow into the engine to compensate for said load increase; and
   increasing said alternator load concurrently with said step of adjusting.

10. The method of claim 8 further comprising:
    detecting a load decrease on said engine; and
    adjusting spark timing to compensate for said load decrease, to maintain said idle speed of said engine.

11. The method of claim 9 further comprising:
    detecting a load decrease of said engine;
    increasing said alternator load to compensate for said load decrease; and
    adjusting said air flow into said engine while decreasing said alternator load to maintain the idle speed of said engine.

12. A method of controlling idle speed of a spark ignition engine comprising:
    detecting an idle condition of an engine;
    increasing an alternator load in response to said idle condition; and
    reducing said alternator load in response to a load increase on said engine to maintain an idle speed of said engine.

13. The method of claim 12 further comprising:
    detecting said load increase on said engine;
    adjusting air flow into the engine to compensate for said load increase; and
    increasing said alternator load concurrently with said adjusting.

14. The method of claim 13 further comprising:
    detecting a load decrease on said engine;
    increasing said alternator load to compensate for said load decrease; and
    adjusting said air flow into said engine with an electronic throttle while decreasing said alternator load to maintain said idle speed of said engine.

15. The method of claim 13 further comprising:
    detecting a load decrease on said engine; and
    adjusting spark timing to compensate for said load decrease to maintain said idle speed of said engine.

* * * * *